US010417639B1

(12) United States Patent
Beatty et al.

(10) Patent No.: US 10,417,639 B1
(45) Date of Patent: Sep. 17, 2019

(54) TECHNOLOGIES FOR PREPROCESSING TRANSACTION AUTHORIZATION RECORDS

(71) Applicant: Worldpay, LLC, Symmes Township, OH (US)

(72) Inventors: Christopher M. Beatty, Symmes Township, OH (US); Erik William Baar, Symmes Township, OH (US)

(73) Assignee: Worldpay, LLC, Symmes Township, OH (US)

(*) Notice: Subject to any disclaimer, the term of this patent is extended or adjusted under 35 U.S.C. 154(b) by 390 days.

(21) Appl. No.: 15/389,533

(22) Filed: Dec. 23, 2016

Related U.S. Application Data (60) Provisional application No. 62/276,324, filed on Jan. 8, 2016.

(51) Int. Cl.
*G06Q 20/40* (2012.01)
*G06Q 20/10* (2012.01)

(52) U.S. Cl.
CPC ......... *G06Q 20/4016* (2013.01); *G06Q 20/10* (2013.01)

(58) Field of Classification Search
CPC .......................... G06Q 20/4016; G06Q 20/10
See application file for complete search history.

(56) References Cited

U.S. PATENT DOCUMENTS 8,046,238 B2 * 10/2011 Solomon ............ G06Q 10/0631
705/1.1

8,924,297 B2 * 12/2014 Kumnick ............... G06Q 20/20
705/44

(Continued)

FOREIGN PATENT DOCUMENTS

WO WO-2015048236 A1 * 4/2015 ............. G06Q 20/34
WO WO-2015116644 A1 * 8/2015 ......... G06Q 30/0201

OTHER PUBLICATIONS

Packer et al.: Optimizing System z Batch Applications by Exploiting Parallelism, 2014, ibm.com, pp. 1-132 (Year: 2014).*

(Continued)

*Primary Examiner* — Bijendra K Shrestha
(74) *Attorney, Agent, or Firm* — Bookoff McAndrews, PLLC (57) ABSTRACT

Technologies for preprocessing transaction authorization records for clearing data batch file generation include a settlement processing server. The settlement processing server receives transaction authorization records corresponding to authorized transactions. The transaction authorization records are appended to an initial authorization stream. The initial authorization stream is closed and the transaction authorization records appended thereto are split into substreams. The settlement processing server preprocesses the transaction authorization records in each of the substreams. While the transaction authorization records appended to the substreams are preprocessed, the settlement processing server initializes another authorization stream and appends newly received transaction authorization records thereto. A clearing data batch file is generated based at least in part on the transaction authorization records appended to each of the substreams. Other embodiments are described and claimed.

24 Claims, 3 Drawing Sheets

(56) References Cited

U.S. PATENT DOCUMENTS

2003/0225997 A1* 12/2003 Kirovski .................. G06F 8/52
  712/210
2006/0101006 A1* 5/2006 Schofield .......... G06F 16/24557
2011/0238510 A1* 9/2011 Rowen ............... G06K 9/00187
  705/16

OTHER PUBLICATIONS

Malik et al.: A Comprehensive Approach Toward Data Preprocessing Techniques & Association Rules, Dec. 2, 2010, Semantic Scholar, pp. 1-11 (Year: 2010).*
Herbst-Murphy, Susan: Clearing and Srttlement of Interbank Card Transactions: A Master Card Tutorial for Federal Reserve Payment Analysis, Discussion Paper, Payment Card Center, Oct. 2013, Federal Reserve Bank of Philadelphia, pp. 1-22. (Year: 2013).*
Paymetric, Inc.: Introduction to Payment Card Processing in SAP: How to optimize payment card acceptance by leveraging an SAP certfied solution, 2014, pp. 1-13. (Year: 2014).*

* cited by examiner

TECHNOLOGIES FOR PREPROCESSING TRANSACTION AUTHORIZATION RECORDS

RELATED APPLICATION

This application claims priority to U.S. Provisional Application No. 62/276,324, filed Jan. 8, 2016, the entire disclosure of which is hereby incorporated by reference in its entirety.

TECHNICAL FIELD

Embodiments of the technologies described herein relate, in general, to the field of clearing and settlement of transactions. More particularly, the technologies relate to the field of preprocessing transaction authorization records for generation of clearing data batch files.

BACKGROUND

Merchants typically communicate with an acquirer processor in order to facilitate the authorization, clearing, and settlement of transactions, such as payment transactions. Transaction authorization records corresponding to such transactions are generally processed in batch just prior to a cut-off time specified by a payment network.

SUMMARY

In an embodiment, the present disclosure is directed, in part, to a method for preprocessing transaction authorization records for clearing data batch file generation. The method includes receiving, by a settlement processing server, a first transaction authorization record corresponding to a first authorized transaction. The method further includes appending, by the settlement processing server, the first transaction authorization record to a first authorization stream including a plurality of transaction authorization records that correspond to a plurality of authorized transactions. Additionally, the method includes determining, by the settlement processing server, whether to close the first authorization stream. In response to a determination to close the first authorization stream, the method includes closing, by the settlement processing server, the first authorization stream and initializing, by the settlement processing server, a second authorization stream. The method also includes splitting, by the settlement processing server, the plurality of transaction authorization records of the first authorization stream into at least a first authorization substream and a second authorization substream based at least in part on a determined classification for each of the plurality of transaction authorization records of the first authorization stream. The method further includes preprocessing, by the settlement processing server, the plurality of transaction authorization records of the first and second authorization substreams. The method also includes receiving, by the settlement processing server and while preprocessing the plurality of transaction authorization records of the first and second authorization substreams, a second transaction authorization record corresponding to a second authorized transaction. Additionally, the method includes appending, by the settlement processing server, the second transaction authorization record to the second authorization stream and generating, by the settlement processing server, a clearing data batch file based at least in part on the plurality of transaction authorization records of the first and second authorization substreams.

In another embodiment, the present disclosure is directed, in part, to a system for preprocessing transaction authorization records for clearing data batch file generation. The system includes a settlement processing server having a processor executing instructions stored in memory. The instructions, when executed, cause the processor to receive a first transaction authorization record that corresponds to a first authorized transaction. The instructions further cause the processor to append the first transaction authorization record to a first authorization stream that includes a plurality of transaction authorization records that correspond to a plurality of authorized transactions. Additionally, the instructions cause the processor to determine whether to close the first authorization stream. In response to a determination to close the first authorization stream, the instructions cause the processor to close the first authorization stream and initialize a second authorization stream. The instructions further cause the processor to split the plurality of transaction authorization records of the first authorization stream into at least a first authorization substream and a second authorization substream based at least in part on a determined classification for each of the plurality of transaction authorization records of the first authorization stream. Additionally, the instructions cause the processor to preprocess the plurality of transaction authorization records of the first and second authorization substreams. Further, while the plurality of transaction authorization records of the first and second authorization substreams are preprocessed, the instructions also cause the processor to receive a second transaction authorization record that corresponds to a second authorized transaction. Additionally, the instructions cause the processor to append the second transaction authorization record to the second authorization stream and generate a clearing data batch file based at least in part on the plurality of transaction authorization records of the first and second authorization substreams.

In another embodiment, the present disclosure is directed, in part, to a method for preprocessing transaction authorization records for clearing data batch file generation. The method includes receiving, by a settlement processing server, a first transaction authorization record corresponding to a first authorized transaction. The method further includes appending, by the settlement processing server, the first transaction authorization record to a first authorization stream that includes a plurality of transaction authorization records corresponding to a plurality of authorized transactions. Additionally, the method includes closing, by the settlement processing server, the first authorization stream and initializing, by the settlement processing server, a second authorization stream. The method further includes splitting, by the settlement processing server, the plurality of transaction authorization records of the first authorization stream into at least a first authorization substream and a second authorization substream based at least in part on a determined classification for each of the plurality of transaction authorization records of the first authorization stream. The method also includes preprocessing, by the settlement processing server, the plurality of transaction authorization records of the first and second authorization substreams. Additionally, the method includes receiving, by the settlement processing server and while preprocessing the plurality of transaction authorization records of the first and second authorization substreams, a second transaction authorization record corresponding to a second authorized transaction. The method further includes appending, by the settlement processing server, the second transaction authorization record to the second authorization stream and generating, by the settlement processing server, a clearing data batch file based at least in part on the plurality of transaction authorization records of the first and second authorization substreams.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment can be combined with the features of other non-limiting embodiments. Such modifications and variations are intended to be included within the scope of the present disclosure.

For simplicity, the description that follows will be provided by reference to a "payment vehicle" or a "payment card," which generally refers to any type of financial alternative to currency. As is to be clear to those skilled in the art, no aspect of the present disclosure is specifically limited to a specific type of payment vehicle or payment card. Therefore, it is intended that the following description encompasses the use of the present disclosure with many other forms of financial alternatives to currency, including credit cards, debit cards, smart cards, chip-based payment cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, a "virtual" card (e.g., in the form of a display on a smart phone), or any other like financial transaction instrument. In any event, the payment vehicles described herein communicate account information (e.g., an account number or other account indicative information) during a purchase event and/or payment or credit transaction.

Figure 1:
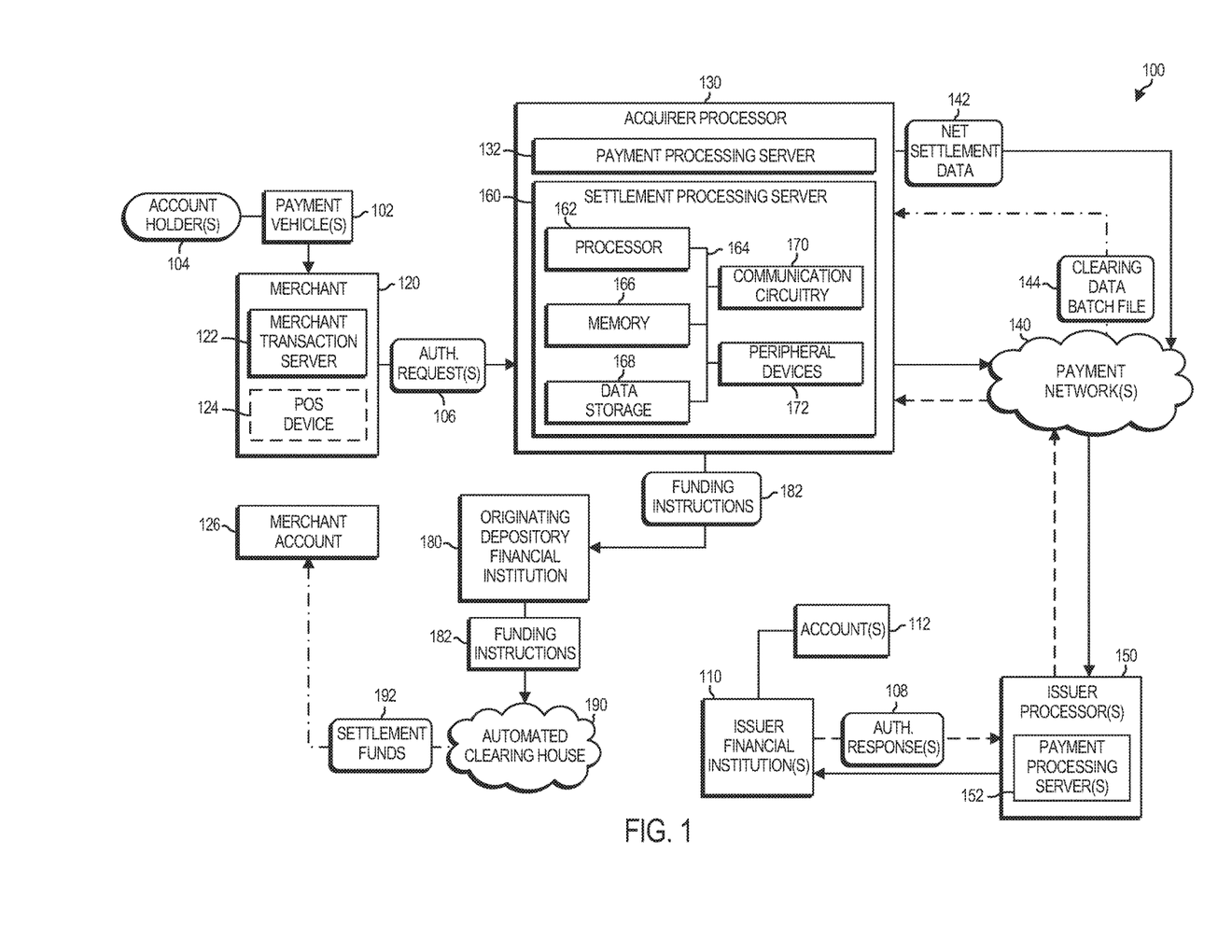
FIG. 1 is a simplified block diagram of at least one embodiment of a system for preprocessing transaction authorization records for clearing data batch file generation.

Referring now to FIG. 1, in one embodiment, a system 100 for preprocessing transaction authorization records to generate one or more clearing data batch files includes a settlement processing server 160 of an acquirer processor 130. In the example system 100, a payment vehicle 102 (e.g., a credit card, a debit card, or any other type of "payment card") can be issued to an account holder 104 by an issuer financial institution 110. The issuer financial institution 110 can be any of a variety of financial institutions capable of issuing a payment vehicle 102 to an account holder 104. In some embodiments, the payment vehicle 102 can be used to pay a merchant 120 for a purchase or payment vehicle transaction.

The merchant 120 can be embodied as any type of retailer, service provider, vendor, or any other type of entity that sells, or offers to sell, a good and/or service. To facilitate sales and accounting activities, the merchant 120 can include various communication networks and computing devices (e.g., sales terminals, back-end servers, payment entry devices, card readers, mobile devices, etc.). For example, as illustratively shown, the merchant 120 includes the merchant transaction server 122. Additionally, in some embodiments, the merchant 120 includes a point of sale (POS) device 124. The merchant 120 can include other computing devices or architectures commonly used by retail merchants, which are not illustrated in FIG. 1 for clarity of the description. In some embodiments such as the one shown in FIG. 1, the merchant 120 (or computing devices thereof) can be in networked communication with the payment processing server 132 and/or the settlement processing server 160 of the acquirer processor 130. In such embodiments, the merchant 120 can use one or more payment/credit processing services of the acquirer processor 130. Payment/credit processing services can include receiving and responding to authorization requests as well as facilitating the settlement of funds associated with payment/credit card-based transactions occurring at the merchant 120.

The merchant POS device 124 can be any device that facilitates receipt of a payment vehicle 102 for payment of a purchase (e.g., a "purchase transaction"), such as for example, a POS terminal, a smartphone communicatively coupled with a payment dongle, or a web interface. The merchant POS device 124 can send an authorization request 106 for the payment vehicle transaction to an acquirer processor 130 that processes payment vehicle transactions for the merchant 120. The authorization request 106 can include identifying information from the payment vehicle 102, such as a payment card number, a number, an expiration date, and a first and last name of the account holder, for example. The authorization request 106 can also include identifying information from the purchase such as an amount and identifying information from the merchant POS device 124, the merchant transaction server 122, and/or the merchant 120, for example. The payment processing server 132 of the acquirer processor 130 can receive the authorization request 106. The payment processing server 132 can translate the authorization request 106, if necessary, and can provide the authorization request 106 to a payment network 140. The payment network 140 can be, for example, a network of a credit card association affiliated with the payment vehicle 102. Non-limiting examples of credit card associations include VISA, MASTERCARD, DISCOVER, and AMERICAN EXPRESS. The authorization request 106 can then be provided to a payment processing server 152 of an issuer processor 150. In response to receiving the authorization request 106, the payment processing server 152 can provide the authorization request 106 to the issuer financial institution 110. Using information from the authorization request 106, the issuer financial institution 110 can associate the payment vehicle transaction with an account 112 of the account holder 104 held by the issuer financial institution 110. The issuer financial institution 110 can then transmit an authorization response 108, which indicates whether the transaction is approved or denied. The authorization response 108 can be provided to the payment processing server 152 of the issuer processor 150 and then provided to the payment network 140. The authorization response 108 can then be provided to the payment processing server 132 of the acquirer processor 130. Upon receiving the authorization response 108, the payment processing server 132 can send either an approval message or a denial message to the merchant POS device 124 to complete the payment vehicle transaction. If the payment vehicle transaction is approved, it can be posted to the account holder's account 112 and reconciled later with the account holder 104 and the merchant 120.

When a transaction is initiated, the transaction can be stored as a transaction record and can comprise transaction data. Transaction records can be stored in one or more locations within the system 100. In one embodiment, the transaction record can be stored within a transaction database (not shown) communicatively coupled to the payment processing server 132, the settlement processing server 160, and/or any other computing device of the acquirer processor 130. The transaction data can be received by the transaction database from various sources, such as the merchant POS device 124, the merchant transaction server 122, the merchant 120, the acquirer processor 130, and so on. A plurality of transaction parameters associated with the payment vehicle transaction can be stored in each transaction record, which can generally be used for clearing, settlement, and financial recordkeeping. While the transaction parameters stored in each transaction record can vary, example transaction parameters can include, without limitation, account number, card number, payment vehicle information, product information (such as product identifier, product type, product serial number, and so forth), transaction amount, loyalty account information, merchant information, transaction date, transaction time, whether the transaction was a "card present" transaction, and so on.

As discussed, the merchant 120 can utilize one or more payment/credit processing services of the acquirer processor 130 to facilitate the settlement of funds associated with payment/credit card-based transactions occurring at the merchant 120. To do so, as discussed in more detail below, the settlement processing server 160 of the acquirer processor 130 can be configured to receive transaction authorization records from the merchant 120 (e.g., from the merchant transaction server 122, the POS device 124, or any other computing device of the merchant 120). The transaction authorization records correspond to authorized payment transactions. In the illustrative embodiment, the settlement processing server 160 appends the received transaction authorization records to an authorization stream (e.g., a log, queue, or list of authorized transactions corresponding to one or more merchants 120 and payment transactions). In response to determining that a reference maximum number of transaction authorization records have been received, as a function of a reference time interval, and/or according to any other criteria, the settlement processing server 160 can close the authorization stream. Thereafter, the settlement processing server 160 can split the transaction authorization records appended to the closed authorization stream in to multiple authorization substreams. The transaction authorization records of each authorization substream can be preprocessed as discussed in more detail below.

In the illustrative embodiment, the settlement processing server 160 can be configured to initialize a new authorization stream in response to closure of the initial authorization stream. Newly received transaction authorization records can be appended to the new authorization stream while the transaction authorization records of the closed authorization stream are being split into the multiple authorization substreams and/or are being preprocessed by the settlement processing server 160. The new authorization stream can be subsequently closed and the transaction authorization records included therein can be split into additional substreams for preprocessing.

In some embodiments, the settlement processing server 160 is configured to facilitate clearing and settlement of the transaction authorization records. In such embodiments, the settlement processing server 160 can generate a clearing data batch file 142 based on the preprocessed transaction authorization records of the authorization substreams. The settlement processing server 160 can then transmit the clearing data batch file 142 to one or more of the payment networks 140 for generation of net settlement data 144. The net settlement data 144 includes data indicative of the net amount of funds due to the acquirer processor 130 and the net amount of funds owed by the issuer financial intuition(s) 110 and/or the responsible issuer processor 150. The net settlement data 144 can be transmitted by the payment network(s) 140 to the settlement processing server 160. Based on the received net settlement data 144, the settlement processing server 160 can generate funding instructions 182. The funding instructions 182 can include rules or directives for transferring or disbursing received settlement funds 192, or a portion thereof, into the account 126 of the merchant 120 and/or various other accounts (not shown).

In some embodiments, the funding instructions 182 can be transmitted to an originating depository financial institution (ODFI) 180 or other suitable entity. In such embodiments, the ODFI 180 can facilitate settlement of the authorized transactions and distribute incoming settlement funds 192 according to the funding instructions 182. The ODFI 180 can, in some embodiments, transmit the funding instructions 182 to the automated clearing house 190 to facilitate distributing the settlement funds 192 to the appropriate accounts (e.g., the merchant account 126).

It should be appreciated that by initializing a new authorization stream for appending newly received transaction authorization records while the transaction authorization records of the initial authorization stream are split into substreams and preprocessed, the computational resources required for processing transaction authorization records can be reduced and optimized. That is, rather than processing transaction authorization records in batch just prior to generation of the clearing data batch file 142, such transaction authorization records can be preprocessed dynamically or more often, which enables further preprocessing services to be offered to merchants 120 and spreads computational loads over a greater period of time. In some embodiments, one or more of the authorization streams, the authorization substreams, and/or the transaction authorization records appended thereto can be stored in the memory 166 (or other temporary memory device) of the settlement processing server 160 instead of being stored in the data storage 168 of the settlement processing server 160 as a data file. It should be appreciated that in such embodiments, the computational resources required for processing the transaction authorization records can be further reduced and optimized.

The settlement processing server 160 of the acquirer processor 130 can be embodied as a computing device or server capable of processing, communicating, storing, maintaining, and transferring data. For example, the settlement processing server 160 can be embodied as a server, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. In some embodiments, the settlement processing server 160 can be embodied as a computing device integrated with other systems or subsystems. In some embodiments, the settlement processing server 160 can form part of, or otherwise be incorporated with, the payment processing server 132 of the acquirer processor 130. In the illustrative embodiment of FIG. 1, the settlement processing server 160 includes a processor 162, a system bus 164, a memory 166, a data storage 168, communication circuitry 170, and one or more peripheral devices 172. The settlement processing server 160 can include other or additional components, such as those commonly found in a server and/or computer (e.g., various input/output devices), in other embodiments. Additionally, in some embodiments, one or more of the illustrative components can be incorporated in, or otherwise from a portion of, another component. For example, the memory 166, or portions thereof, can be incorporated in the processor 162 in some embodiments. Furthermore, it should be appreciated that the settlement processing server 160 can include other components, sub-components, and devices commonly found in a computer and/or computing device, which are not illustrated in FIG. 1 for clarity of the description.

The processor 162 can be embodied as any type of processor capable of performing the functions described herein. For example, the processor 162 can be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

In various configurations, the settlement processing server 160 includes a system bus 164 for interconnecting the various components of the settlement processing server 160. The system bus 164 can be embodied as, or otherwise include, memory controller hubs, input/output control hubs, firmware devices, communication links (e.g., point-to-point links, bus links, wires, cables, light guides, printed circuit board traces, etc.) and/or other components and subsystems to facilitate the input/output operations with the processor 162, the memory 166, and other components of the settlement processing server 160. In some embodiments, the settlement processing server 160 can be integrated into one or more chips such as a programmable logic device or an application specific integrated circuit (ASIC). In such embodiments, the system bus 164 can form a portion of a system-on-a-chip (SoC) and be incorporated, along with the processor 162, the memory 166, and other components of the settlement processing server 160, on a single integrated circuit chip.

The memory 166 can be embodied as any type of volatile or non-volatile memory or data storage capable of performing the functions described herein. For example, the memory 166 can be embodied as read only memory (ROM), random access memory (RAM), cache memory associated with the processor 162, or other memories such as dynamic RAM (DRAM), static RAM (SRAM), programmable ROM (PROM), electrically erasable PROM (EEPROM), flash memory, a removable memory card or disk, a solid state drive, and so forth. In operation, the memory 166 can store various data and software used during operation of the settlement processing server 160 such as operating systems, applications, programs, libraries, and drivers.

The data storage 168 can be embodied as any type of device or devices configured for short-term or long-term storage of data such as, for example, memory devices and circuits, memory cards, hard disk drives, solid-state drives, or other data storage devices. For example, in some embodiments, the data storage 168 includes storage media such as a storage device that can be configured to have multiple modules, such as magnetic disk drives, floppy drives, tape drives, hard drives, optical drives and media, magneto-optical drives and media, Compact Disc (CD) drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 162, or the memory 166 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

The communication circuitry 170 of the settlement processing server 160 can be embodied as any type of communication circuit, device, interface, or collection thereof, capable of enabling communications between the settlement processing server 160 and the payment processing server 130 of the acquirer processor 130 (or other computing devices associated therewith), the merchant transaction server 122 and the POS device 124 of the merchant 120 (or other computing devices associated therewith), the payment network(s) 140 (or computing devices associated therewith), the payment processing server 152 of the issuer processor 150 (or other computing devices associated therewith), the issuer financial institution 110 (or computing devices associated therewith), the originating depository financial institution 180 (or computing device associated therewith), the automated clearing house 190 (or computing devices associated therewith), and/or any other computing device communicatively coupled thereto. For example, the communication circuitry 170 can be embodied as one or more network interface controllers (NICs), in some embodiments. The communication circuitry 170 can be configured to use any one or more communication technologies (e.g., wireless or wired communications) and associated protocols (e.g., Ethernet, Wi-Fi®, WiMAX, etc.) to effect such communication.

In some embodiments, the settlement processing server 160, the payment processing server 130 of the acquirer processor 130 (or other computing devices associated therewith), the merchant transaction server 122 and the POS device 124 of the merchant 120 (or other computing devices associated therewith), the payment network(s) 140 (or computing devices associated therewith), the payment processing server 152 of the issuer processor 150 (or other computing devices associated therewith), the issuer financial institution 110 (or computing devices associated therewith), the originating depository financial institution 180 (or computing device associated therewith), the automated clearing house 190 (or computing devices associated therewith), and/or any other computing devices of the system 100, can communicate with each other over one or more networks. The network(s) can be embodied as any number of various wired and/or wireless communication networks. For example, the network(s) can be embodied as or otherwise include a local area network (LAN), a wide area network (WAN), a cellular network, or a publicly-accessible, global network such as the Internet. Additionally, the network(s) can include any number of additional devices to facilitate communications between the computing devices of the system 100.

Additionally, in some embodiments, the settlement processing server 160 can further include one or more peripheral devices 172. Such peripheral devices 172 can include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

In some embodiments, the merchant transaction server 122 and the POS device 124 (or other computing devices of the merchant 120), the payment processing server 132 and the settlement processing server 160 (or other computing devices of the acquirer processor 130), the payment network(s) 140 (or computing devices thereof), the payment processing server(s) 152 (or other computing devices of the issuer processor(s) 150), the issuer financial institution 110 (or computing devices thereof), the originating depository financial institution 180 (or computing devices therefore), and/or the automated clearing house 190 (or computing devices thereof) can each establish an environment during operation. Each environment can include various modules, components, sub-components, and devices commonly found in computing devices, which are not illustrated in the figures for clarity of the description. The various modules, components, sub-components, and devices of each environment can be embodied as hardware, firmware, software, or a combination thereof. For example, one or more of the modules, components, sub-components, and devices of each environment can be embodied as a processor and/or a controller configured to provide the functionality described herein.

Figure 2:
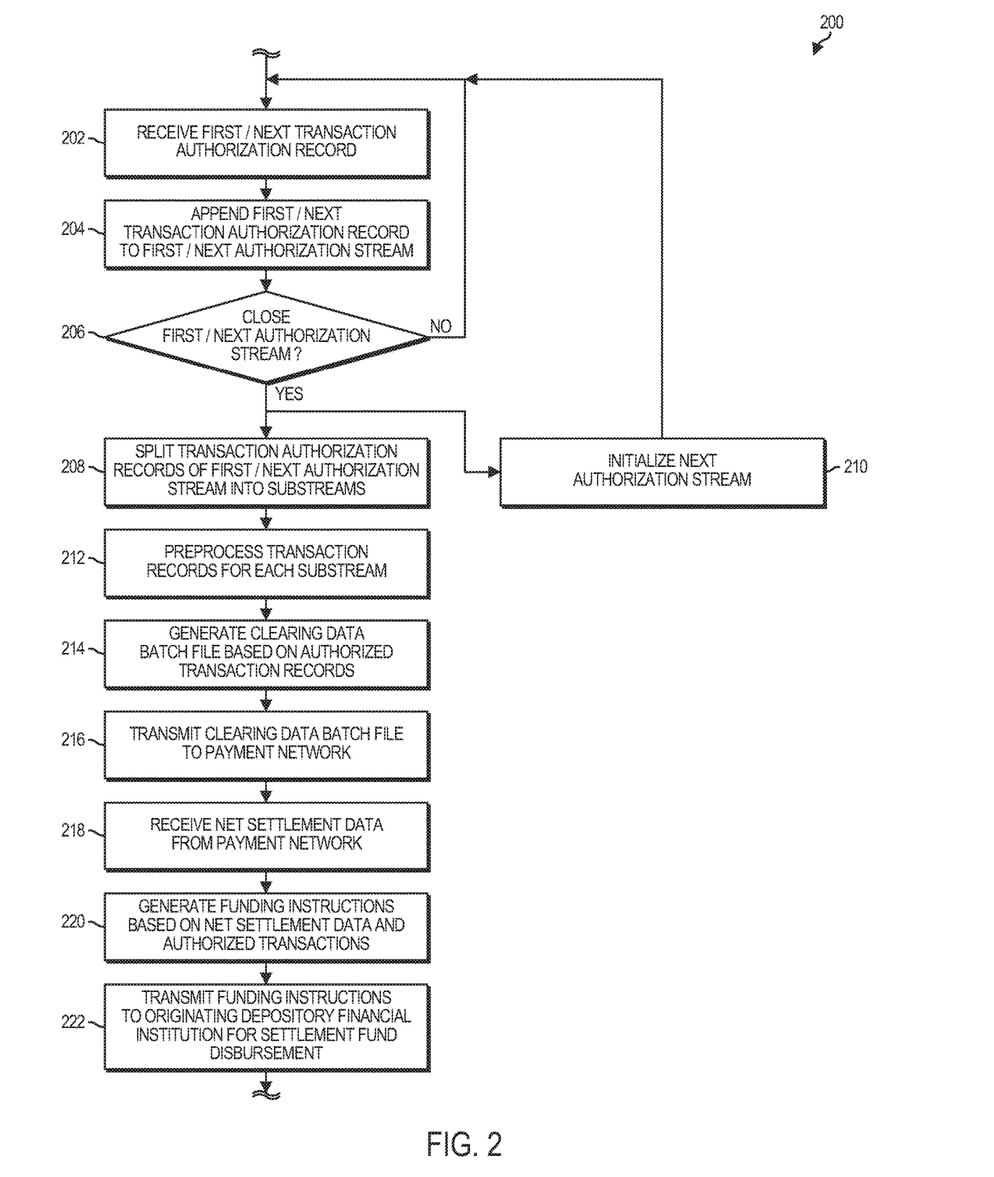
FIG. 2 is a simplified flow diagram of at least one embodiment of a method that may be executed by the settlement processing server of FIG. 1 for preprocessing transaction authorization records for clearing data batch file generation.

Referring now to FIG. 2, a method 200 that may be executed by the settlement processing server 160 of the acquirer processor 130 for preprocessing transaction authorization records and generating one or more clearing data batch files begins with block 202. In block 202, the settlement processing server 160 receives a transaction authorization record corresponding to an authorized payment transaction. In some embodiments, transaction authorization records are received from the merchant transaction server 122 or the POS device 124 of the merchant 120. In other embodiments, the transaction authorization records are maintained locally by the payment processing server 132 or the settlement transaction server 160 of the acquirer processor 130 as a function of authorization response messages 108 received via the payment network(s) 140. It should be appreciated that in the first iteration of the method 200, the received transaction authorization record can be embodied as the first transaction authorization record received.

In block 204, the settlement processing server 160 appends the first transaction authorization record to an authorization stream. As discussed, the authorization stream can be embodied as a log, queue, or list of authorized transactions corresponding to one or more merchants 120 and payment transactions. In the illustrative embodiment, the authorization stream includes one or more transaction authorization records waiting to be processed for clearing and settlement with the payment network(s) 140 and/or the issuer financial institution 110. In the first iteration of the method 200, the authorization stream is embodied as a first authorization stream and the first transaction authorization record is appended thereto by the settlement processing server 160.

In decision block 206, the settlement processing server 160 determines whether to close the first authorization stream. To do so, in some embodiments, the settlement processing server 160 can determine to close the first authorization stream in response to determining that the first authorization stream includes a reference maximum number of transaction authorization records. Additionally or alternatively, the settlement processing server 160 can determine to close the first authorization stream based at least in part on, or otherwise as a function of, a reference time interval or a configurable schedule. In some embodiments, the settlement processing server 160 can determine to close the first authorization stream based on receiving a request from the merchant 120, the payment network(s) 140, the issuer processor 150, the issuer financial institution 110, the originating depository financial institution 180, the automated clearing house 190, or any other entity or computing device. If, in decision block 206, the settlement processing server 160 determines not to close the first authorization stream, the method 200 loops back to block 202 and the next transaction authorization record is received. If, however, the settlement processing server 160 determines instead to close the first authorization stream, the first authorization stream is closed and the method 200 advances to blocks 208 and 210.

In block 208, in response to closing the first authorization stream, the settlement processing server 160 splits the transaction authorization records of the first authorization stream into multiple authorization substreams. In some embodiments, the transaction authorization records of the first authorization stream can be spilt into authorization substreams based at least in part on, or otherwise as a function of, a classification of each of the transaction authorization records. For example, the settlement processing server 160 can place, move, or copy transaction authorization records of the first authorization stream having a first classification (e.g., a particular payment card type) into at least a first authorization substream and place, move, or copy transaction authorization records of the first authorization stream having a second classification (e.g., a different payment card type) into a second authorization substream.

In some embodiments, to facilitate splitting the transaction authorization records of the first authorization stream into different authorization substreams, the settlement processing server 160 can determine a classification for each of the transaction authorization records of the first authorization stream. For example, the settlement processing server 160 can classify each of the transactions according to at least one of the merchant identifier of the corresponding merchant 120, the type of payment card used for the corresponding payment transaction, the particular payment network 140 associated with the payment card used for the corresponding payment transaction, one or more service level agreements between the acquirer processor 130 and the merchant 120, interchange fee agreements, one or more reference clearing or settlement cut-off times, the number and complexity of one or more value-added services (e.g., settlement report generation, clearing report generation, fraud detection, transaction analysis, etc.) to be performed on each transaction, and/or according to any other criteria for classifying transactions or optimizing transaction record processing. In some embodiments, the settlement processing server 160 analyzes transaction data (e.g., an account number, a card number, other payment vehicle data, a transaction amount, a transaction date, a transaction time, a transaction type, loyalty account information, a merchant identifier, a merchant location, other merchant information, etc.) associated with each of the transaction authorization records to facilitate classification.

In block 212, the settlement processing server 160 preprocesses the transaction authorization records of each of the substreams. For example, the settlement processing server 160 can generate one or more settlement or clearing reports for the transaction authorization records of each of the substreams. In another example, the settlement processing server 160 can analyze the transaction authorization records of each of the substreams to detect instances of fraudulent activity. In yet another example, the settlement processing server 160 can analyze the transaction authorization records of each of the substreams to determine consumer spending trends or for any other purpose (e.g., marketing, quality control, etc.).

In block 210 and in response to determining to close the first authorization stream, the settlement processing server 160 initializes a new authorization stream (herein referred to as the "next authorization stream"). The method 200 then loops back to block 202 and the settlement processing server 160 receives another transaction authorization record corresponding to another authorized payment transaction (herein referred to as the "next transaction authorization record" and the "next authorized payment transaction," respectfully). The method 200 then advances to blocks 204-212 in which the settlement processing server 160 appends the next transaction authorization record to the next authorization stream, determines to close and closes the next authorization stream, splits the transaction authorization records of the next authorization stream into multiple authorization substreams, and preprocesses the authorization records of each of the substreams in a manner similar to that discussed above regarding the first transaction record and the first authorization stream. It should be appreciated that the settlement processing server 160 iteratively provides the functionality of blocks 202-212 for each new authorization stream for a reference number iterations or according to any other configurable criteria. It should be appreciated that, in some embodiments, one or more of the authorization streams, the authorization substreams, and/or the transaction authorization records appended thereto can be stored in the memory 166 (or other temporary memory device) of the settlement processing server 160 instead of being stored in the data storage 168 of the settlement processing server 160 as a data file. In doing so, the computational resources required for processing the transaction authorization records can be reduced and optimized.

In block 214, the settlement processing server 160 generates a clearing data batch file based on the preprocessed transaction authorization records of each of the substreams, or more generally, each of the authorization streams. For example, the settlement processing server 160 can generate a clearing data batch 142 file based on the transaction authorization records of the substreams of the first authorization stream and the next authorization stream. As discussed in more detail below, the clearing data batch file 142 includes transaction authorization data to be processed by one or more of the payment network(s) 140. The clearing data batch file 142 can be generated based on a predefined or reference schedule, or it can be generated dynamically by the settlement processing server 160 according to any suitable criteria. For example, the settlement processing server 160 can generate the clearing data batch file 142 based on a predefined schedule (e.g., a predefined interval or cut-off time specified by the payment network(s) 140). In other examples, the settlement processing server 160 can generate the clearing data batch file 142 in response to determining that a reference threshold number of transaction authorization records have been received or preprocessed. Additionally or alternatively, the settlement processing server 160 can generate the clearing data batch file 142 based on preferences of the merchant 120 and/or in response to a request to generate the clearing data batch file 142 received from the merchant 120. Also, in some embodiments, the settlement processing server 160 can generate multiple clearing data batch files 142. For example, the settlement processing server 160 can generate a separate clearing data batch file 142 for each of a plurality of payment networks 140 based on the type of payment vehicle 102 used for the corresponding payment transaction.

In block 216, the settlement processing server 160 transmits the clearing data batch file 142 to one or more of the payment network(s) 140. In block 218, the settlement processing server 160 receives net settlement data 144 from the payment network(s) 140 based on the transmitted clearing data batch file 142. The net settlement data 144 includes data indicative of the net amount of funds due to the acquirer processor 130 and the net amount of funds owed by the issuer financial intuition(s) 110 and/or the responsible issuer processor 150. In the illustrative embodiment, the payment network(s) 140 generate the net settlement data 144 based on the clearing data batch file 142 received from the settlement processing server 160 according to typical transaction clearing techniques.

In block 220, the settlement processing server 160 generates funding instructions 182 based on the net settlement data 144 received from the payment network(s) 140. The funding instructions 182 include rules or directives for transferring settlement funds 192, or a portion thereof, into the account 126 of the merchant 120 and/or various other accounts (not shown). For example, the funding instructions 182 can specify that a specific amount of the received settlement funds 192 should be deposited into the account 126 of the merchant 120. In another example, the funding instructions 182 can specify that a portion of the settlement funds 192 should be deposited into an account of one merchant 120 and the remainder of the settlement funds 192 should be deposited into an account of a different merchant. It should be appreciated that the funding instructions 182 can include any type of rule or directive for distributing settlement funds 192 received via a settlement process.

In some embodiments, in block 222, the settlement processing server 160 can transmit the funding instructions 182 to an originating depository financial institution (ODFI) 180 or other suitable entity. In such embodiments, the ODFI 180 can facilitate settlement of the authorized transactions and distribute incoming settlement funds 192 according to the funding instructions 182. The ODFI 180 can, in some embodiments, transmit the funding instructions 182 to the automated clearing house 190 to facilitate distributing the settlement funds 192 to the appropriate accounts (e.g., the merchant account 126). It should be appreciated that the settlement processing server 160 and/or the ODFI 180 can use any other process for finalizing settlement of the authorized transaction records and distributing the corresponding settlement funds 192.

Figure 3:
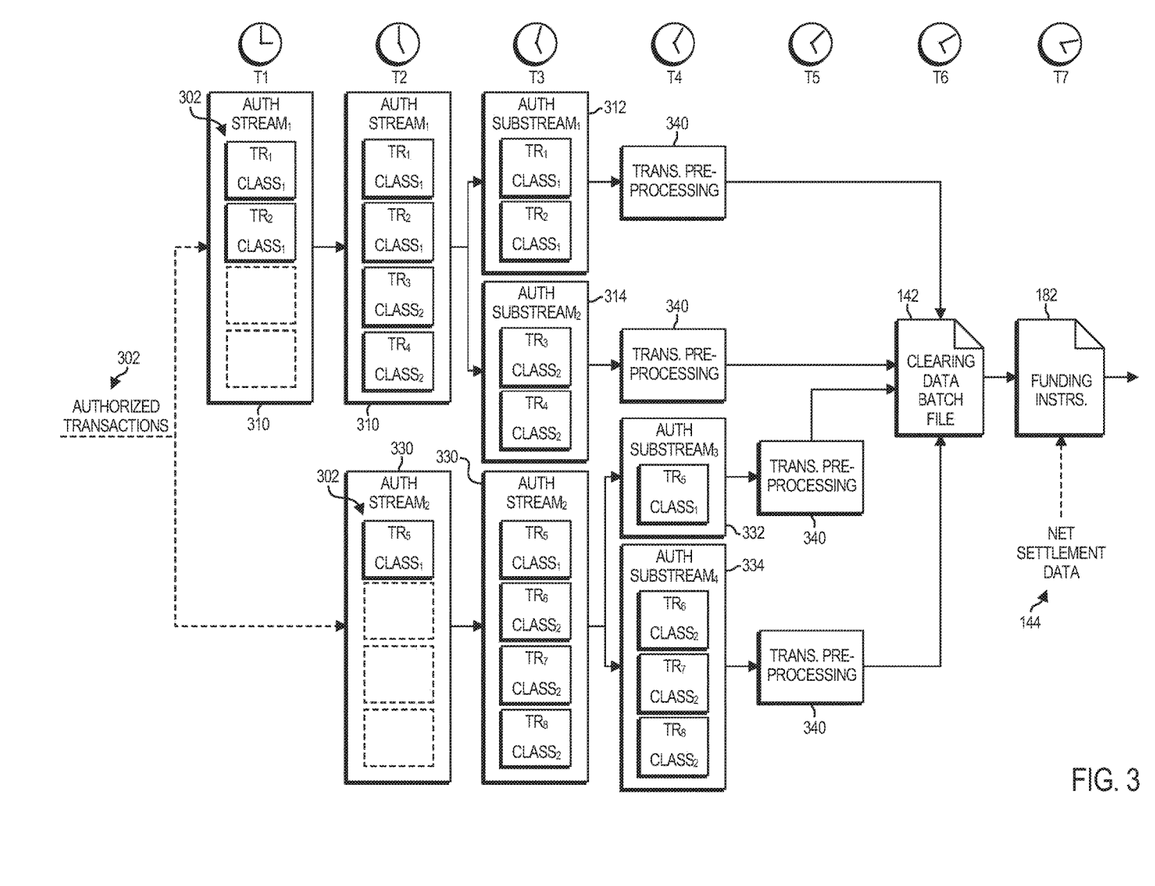
FIG. 3 is a simplified schematic representation of preprocessing transaction authorization records and generating a clearing data batch file through execution of the method of FIG. 2, in accordance with at least one embodiment.

Referring now to FIG. 3, a simplified schematic representation of preprocessing transaction authorization records and generating a clearing data batch file through execution of the method of FIG. 2, in accordance with at least one embodiment. At time T1, the settlement processing server 160 receives one or more transaction authorization records 302 (e.g., authorization records $TR_1$, $TR_2$, etc.) from the merchant 120. In some embodiments, the transaction authorization records 302 are retrieved from a local storage and/or computing device communicatively coupled to the settlement processing server 160. Subsequent to receiving each transaction authorization record 302, the settlement processing server 160 appends the corresponding transaction authorization record 302 to a first authorization stream 310 (e.g., AUTH $STREAM_1$).

At time T2, the settlement processing server 160 determines that the first authorization stream 310 (e.g., AUTH $STREAM_1$) should be closed as discussed above. In some embodiments, such as the one shown in FIG. 3, the settlement processing server 160 initializes a new or second authorization stream 330 (e.g., AUTH $STREAM_2$) for appending newly received transaction authorization records 302 thereto. It should be appreciated that in other embodiments, the settlement processing server 160 instead initializes the new or second authorization stream 330 (e.g., AUTH $STREAM_2$) at T3 or at any other time prior to generation of the clearing data batch file 142.

At T3, the settlement processing server 160 splits the transaction authorization records 302 of the first authorization stream 310 (e.g., AUTH $STREAM_1$) into two or more authorization substreams 312, 314 (e.g., AUTH $SUBSTREAM_1$ and AUTH $SUBSTREAM_2$). As discussed above, the transaction authorization records 302 of the first authorization stream 310 (e.g., AUTH $STREAM_1$) can be split into the authorization substreams 312, 314 (e.g., AUTH $SUBSTREAM_1$ and AUTH $SUBSTREAM_2$) based at least in part on, or otherwise as a function of, a classification of each of the transaction authorization records (e.g., $CLASS_1$ and $CLASS_2$). In addition to splitting the transaction authorization records 302 of the first authorization stream 310 (e.g., AUTH $STREAM_1$) into two or more authorization substreams 312, 314 (e.g., AUTH $SUBSTREAM_1$ and AUTH $SUBSTREAM_2$) at T3, the settlement processing server 160 can also determine whether the second authorization stream 330 (e.g., AUTH $STREAM_2$) should be closed.

At time T4, the settlement processing server 160 preprocesses 340 the transaction authorization records of each of the authorization substreams 312, 314 (e.g., AUTH $SUBSTREAM_1$ and AUTH $SUBSTREAM_2$) of the first authorization stream 310 (e.g., AUTH $STREAM_1$). While the settlement processing server 160 preprocesses 340 the transaction authorization records of each of the authorization substreams 312, 314 at T4, the settlement processing server 160 splits the second authorization stream 330 (e.g., AUTH $STREAM_2$) into two or more authorization substreams 332, 334 (e.g., AUTH $SUBSTREAM_3$ and AUTH $SUBSTREAM_4$). Subsequently, at time T5, the settlement processing server 160 preprocesses 340 the transaction authorization records of each of the authorization substreams 332, 334 (e.g., AUTH $SUBSTREAM_3$ and AUTH $SUBSTREAM_4$) of the second authorization stream 310 (e.g., AUTH $STREAM_2$).

At T6, the settlement processing server 160 generates one or more clearing data batch files 142 based on the preprocessed transaction authorization records of each of the substreams 312, 314, 332, 334 (e.g., AUTH $SUBSTREAM_1$, AUTH $SUBSTREAM_2$, AUTH $SUBSTREAM_3$, and AUTH $SUBSTREAM_4$), or more generally, each of the authorization streams 210, 230 (e.g., AUTH $STREAM_1$ and AUTH $STREAM_2$). As discussed, the clearing data batch file(s) 142 can be transmitted to the corresponding payment network(s) 140 for clearing processing and generation of net settlement data 144. At T7, the settlement processing server 160 receives net settlement data 144 from the payment network(s) 140 and generates funding instructions 182 therefrom. In some embodiments, the funding instructions 182 are transmitted to an originating depository financial institution (ODFI) 180 or other suitable entity for finalizing settlement of the authorized transactions and distributing the corresponding settlement funds 192.

It should be appreciated that by initializing a new authorization stream 330 (e.g., AUTH $STREAM_2$) for appending newly received transaction authorization records 302 while the transaction authorization records 302 of the first authorization stream 310 (e.g., AUTH $STREAM_1$) are split into substreams 312, 314 and preprocessed 340, the computational resources required for processing transaction authorization records 302 can be reduced and optimized. That is, rather than processing transaction authorization records 302 in batch just prior to generation of the clearing data batch file 142, such transaction authorization records 302 can be preprocessed dynamically or more often, which enables further preprocessing services to be offered to merchants 120 and spreads computational loads over a greater period of time. Further, due to the grouping of transaction authorization records 302 by classification prior to preprocessing, additional processing efficiencies can be realized. Additionally, in some embodiments, one or more of the authorization streams (e.g., AUTH STREAK 310, AUTH $STREAM_2$ 330, etc.), the authorization substreams (e.g., AUTH $SUBSTREAM_1$ 312, AUTH $SUBSTREAM_2$ 314, AUTH $SUBSTREAM_3$ 332, AUTH $SUBSTREAM_4$ 334, etc.), and/or the transaction authorization records 302 appended thereto can be stored in the memory 166 (or other temporary memory device) of the settlement processing server 160 instead of being stored in the data storage 168 of the settlement processing server 160 as a data file. It should be appreciated that in such embodiments, the computational resources required for processing the transaction authorization records can be further reduced and optimized.

Techniques discussed herein improve the field of transaction processing by allowing for efficient techniques of creating and preprocessing authorization substreams. Transactions can be preprocessed in order to more efficiently use computational resources. Computational loads may be spread over greater periods of time, thus preventing a shortage of computational capacity at any given time and improving the functioning of computers utilizing these techniques. Techniques presented herein disclose particular methods of processing authorization streams, while not precluding all methods of processing authorization streams.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed herein should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods can be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and can be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead can be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics can be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions can be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A method for preprocessing transaction authorization records for clearing data batch file generation, the method comprising:
   receiving, by a settlement processing server, a first transaction authorization record corresponding to a first authorized transaction;
   appending the first transaction authorization record to a first authorization stream comprising a plurality of transaction authorization records corresponding to a plurality of authorized transactions;
   determining, by the settlement processing server, whether to close the first authorization stream;
   in response to a determination to close the first authorization stream:
      closing, by the settlement processing server, the first authorization stream;
      initializing, by the settlement processing server, a second authorization stream;
      splitting, by the settlement processing server, the plurality of transaction authorization records of the first authorization stream into at least a first authorization substream and a second authorization substream based at least in part on a determined classification for each of the plurality of transaction authorization records of the first authorization stream;
      preprocessing, by the settlement processing server, the plurality of transaction authorization records of the first and second authorization substreams;
      receiving, by the settlement processing server and while preprocessing the plurality of transaction authorization records of the first and second authorization substreams, a second transaction authorization record corresponding to a second authorized transaction; and appending, by the settlement processing server, the second transaction authorization record to the second authorization stream; and generating, by the settlement processing server, a clearing data batch file based at least in part on the plurality of transaction authorization records of the first and second authorization substreams.

2. The method of claim 1, further comprising:

receiving, by the settlement processing server and while preprocessing the plurality of transaction authorization records of the first and second authorization substreams, a plurality of additional transaction authorization records corresponding to a plurality of additional authorized transactions;

appending, by the settlement processing server, the plurality of additional transaction authorization records to a second authorization stream;

determining, by the settlement processing server, whether to close the second authorization stream;

in response to a determination to close the second authorization stream:

closing, by the settlement processing server, the second authorization stream;

splitting, by the settlement processing server, the plurality of additional transaction authorization records of the second authorization stream into a third authorization substream and a fourth authorization substream based at least in part on a determined classification for each of the plurality of additional transaction authorization records of the second authorization stream; and preprocessing, by the settlement processing server, the plurality of additional transaction authorization records of the third and fourth authorization substreams; and wherein generating the clearing data batch file comprises generating the clearing data batch file based at least in part on the plurality of transaction authorization records of the first and second authorization substreams and the plurality of additional transaction authorization records of the third and fourth authorization substreams.

3. The method of claim 2, further comprising:

transmitting, by the settlement processing server, the clearing data batch file to a settlement processing computing device of a payment network; and receiving, by the settlement processing server, net settlement data from the settlement processing computing device of the payment network, the received net settlement data is based on the clearing data batch file.

4. The method of claim 3, further comprising finalizing, by the settlement processing server, settlement of the plurality of transaction authorization records of the first, second, third, and fourth authorization substreams as a function of the clearing data batch file.

5. The method of claim 4, wherein finalizing settlement of the plurality of transaction authorization records comprises:

generating, by the settlement processing server, funding instructions based at least in part on the net settlement data received from the settlement processing computing device of the payment network; and transmitting, by the settlement processing server, the funding instructions to a funding computing device of a financial institution, the funding instructions indicate an amount of funds for transfer to an account of a merchant.

6. The method of claim 1, further comprising determining, by the settlement processing server, the classification for each of the plurality of transaction authorization records of the first authorization stream based on the plurality of transaction authorization records corresponding to the plurality of authorized transactions.

7. The method of claim 6, wherein the determined classification for each of the plurality of transaction authorization records of the first authorization stream comprises at least one of a merchant identifier, a payment card type, a reference settlement cut-off time, a reference clearing cut-off time, a transaction amount, or interchange fees.

8. The method of claim 1, wherein preprocessing the plurality of transaction authorization records of the first and second authorization substreams comprises at least one of generating a settlement report for the plurality of transaction authorization records of the first and second authorization substreams, analyzing the plurality of transaction authorization records of the first and second authorization substreams, or detecting fraudulent activity corresponding to one or more of the plurality of transaction authorization records of the first and second authorization substreams.

9. A system for preprocessing transaction authorization records for clearing data batch file generation, the system comprising:

a settlement processing server comprising a processor executing instructions stored in memory, wherein the instructions cause the processor to:

receive a first transaction authorization record that corresponds to a first authorized transaction;

append the first transaction authorization record to a first authorization stream that comprises a plurality of transaction authorization records that correspond to a plurality of authorized transactions;

determine whether to close the first authorization stream;

in response to a determination to close the first authorization stream:

close the first authorization stream;

initialize a second authorization stream;

split the plurality of transaction authorization records of the first authorization stream into at least a first authorization substream and a second authorization substream based at least in part on a determined classification for each of the plurality of transaction authorization records of the first authorization stream;

preprocess the plurality of transaction authorization records of the first and second authorization substreams;

receive, while the plurality of transaction authorization records of the first and second authorization substreams are preprocessed, a second transaction authorization record that corresponds to a second authorized transaction; and append the second transaction authorization record to the second authorization stream; and generate a clearing data batch file based at least in part on the plurality of transaction authorization records of the first and second authorization substreams.

10. The system of claim 9, wherein the instructions of the settlement processing server further cause the processor to:

receive, while the plurality of transaction authorization records of the first and second authorization substreams are preprocessed, a plurality of additional transaction authorization records that correspond to a plurality of additional authorized transactions;
append the plurality of additional transaction authorization records to a second authorization stream;
determine whether to close the second authorization stream;
in response to a determination to close the second authorization stream:
close the second authorization stream;
split the plurality of additional transaction authorization records of the second authorization stream into a third authorization substream and a fourth authorization substream based at least in part on a determined classification for each of the plurality of additional transaction authorization records of the second authorization stream; and
preprocess the plurality of additional transaction authorization records of the third and fourth authorization substreams; and
wherein to generate the clearing data batch file comprises to generate the clearing data batch file based at least in part on the plurality of transaction authorization records of the first and second authorization substreams and the plurality of additional transaction authorization records of the third and fourth authorization substreams.

11. The system of claim 10, wherein the instructions of the settlement processing server further cause the processor to:
transmit the clearing data batch file to a settlement processing computing device of a payment network; and
receive net settlement data from the settlement processing computing device of the payment network, the received net settlement data is based on the clearing data batch file.

12. The system of claim 11, wherein the instructions of the settlement processing server further cause the processor to finalize settlement of the plurality of transaction authorization records of the first, second, third, and fourth authorization substreams as a function of the clearing data batch file.

13. The system of claim 12, wherein to finalize settlement of the plurality of transaction authorization records comprises to:
generate funding instructions based at least in part on the net settlement data received from the settlement processing computing device of the payment network; and
transmit the funding instructions to a funding computing device of a financial institution, the funding instructions indicate an amount of funds for transfer to an account of a merchant.

14. The system of claim 9, wherein the instructions of the settlement processing server further cause the processor to determine the classification for each of the plurality of transaction authorization records of the first authorization stream based on the plurality of transaction authorization records that correspond to the plurality of authorized transactions.

15. The system of claim 14, wherein the determined classification for each of the plurality of transaction authorization records of the first authorization stream comprises at least one of a merchant identifier, a payment card type, a reference settlement cut-off time, a reference clearing cut-off time, a transaction amount, or interchange fees.

16. The system of claim 9, wherein to preprocess the plurality of transaction authorization records of the first and second authorization substreams comprises to at least one of generate a settlement report for the plurality of transaction authorization records of the first and second authorization substreams, analyze the plurality of transaction authorization records of the first and second authorization substreams, or detect fraudulent activity corresponding to one or more of the plurality of transaction authorization records of the first and second authorization substreams.

17. A method for preprocessing transaction authorization records for clearing data batch file generation, the method comprising:
receiving, by a settlement processing server, a first transaction authorization record corresponding to a first authorized transaction;
appending, by the settlement processing server, the first transaction authorization record to a first authorization stream comprising a plurality of transaction authorization records corresponding to a plurality of authorized transactions;
closing, by the settlement processing server, the first authorization stream;
initializing, by the settlement processing server, a second authorization stream;
splitting, by the settlement processing server, the plurality of transaction authorization records of the first authorization stream into at least a first authorization substream and a second authorization substream based at least in part on a determined classification for each of the plurality of transaction authorization records of the first authorization stream;
preprocessing, by the settlement processing server, the plurality of transaction authorization records of the first and second authorization substreams;
receiving, by the settlement processing server and while preprocessing the plurality of transaction authorization records of the first and second authorization substreams, a second transaction authorization record corresponding to a second authorized transaction;
appending, by the settlement processing server, the second transaction authorization record to the second authorization stream; and
generating, by the settlement processing server, a clearing data batch file based at least in part on the plurality of transaction authorization records of the first and second authorization substreams.

18. The method of claim 17, further comprising:
receiving, by the settlement processing server and while preprocessing the plurality of transaction authorization records of the first and second authorization substreams, a plurality of additional transaction authorization records corresponding to a plurality of additional authorized transactions;
appending, by the settlement processing server, the plurality of additional transaction authorization records to a second authorization stream;
closing, by the settlement processing server, the second authorization stream;
splitting, by the settlement processing server, the plurality of additional transaction authorization records of the second authorization stream into a third authorization substream and a fourth authorization substream based at least in part on a determined classification for each of the plurality of additional transaction authorization records of the second authorization stream;
preprocessing, by the settlement processing server, the plurality of additional transaction authorization records of the third and fourth authorization substreams; and
wherein generating the clearing data batch file comprises generating the clearing data batch file based at least in part on the plurality of transaction authorization records of the first and second authorization substreams and the plurality of additional transaction authorization records of the third and fourth authorization substreams.

19. The method of claim 18, further comprising:
transmitting, by the settlement processing server, the clearing data batch file to a settlement processing computing device of a payment network; and
receiving, by the settlement processing server, net settlement data from the settlement processing computing device of the payment network, the received net settlement data is based on the clearing data batch file.

20. The method of claim 19, further comprising finalizing, by the settlement processing server, settlement of the plurality of transaction authorization records of the first, second, third, and fourth authorization substreams as a function of the clearing data batch file.

21. The method of claim 20, wherein finalizing settlement of the plurality of transaction authorization records comprises:
generating, by the settlement processing server, funding instructions based at least in part on the net settlement data received from the settlement processing computing device of the payment network; and
transmitting, by the settlement processing server, the funding instructions to a funding computing device of a financial institution, the funding instructions indicate an amount of funds for transfer to an account of a merchant.

22. The method of claim 17, further comprising determining, by the settlement processing server, the classification for each of the plurality of transaction authorization records of the first authorization stream based on the plurality of transaction authorization records corresponding to the plurality of authorized transactions.

23. The method of claim 22, wherein the determined classification for each of the plurality of transaction authorization records of the first authorization stream comprises at least one of a merchant identifier, a payment card type, a reference settlement cut-off time, a reference clearing cut-off time, a transaction amount, or interchange fees.

24. The method of claim 17, wherein preprocessing the plurality of transaction authorization records of the first and second authorization substreams comprises at least one of generating a settlement report for the plurality of transaction authorization records of the first and second authorization substreams, analyzing the plurality of transaction authorization records of the first and second authorization substreams, or detecting fraudulent activity corresponding to one or more of the plurality of transaction authorization records of the first and second authorization substreams.

* * * * *